US011277061B2

United States Patent
Krishnamurthy et al.

(10) Patent No.: US 11,277,061 B2
(45) Date of Patent: Mar. 15, 2022

(54) MIRRORING OF HIGH ROTOR POLE SWITCHED RELUCTANCE MACHINES

(71) Applicant: Software Motor Company, Sunnyvale, CA (US)

(72) Inventors: Mahesh Krishnamurthy, Wheaton, IL (US); Mark Johnston, Los Altos Hills, CA (US); Trevor Creary, San Jose, CA (US); Piyush Desai, Des Plaines, IL (US)

(73) Assignee: Turntide Technologies, Inc., Sunnyvale, CA (US)

( * ) Notice: Subject to any disclaimer, the term of this patent is extended or adjusted under 35 U.S.C. 154(b) by 147 days.

(21) Appl. No.: 16/822,913

(22) Filed: Mar. 18, 2020

(65) Prior Publication Data

US 2020/0220440 A1    Jul. 9, 2020

Related U.S. Application Data

(63) Continuation of application No. 16/010,612, filed on Jun. 18, 2018, now Pat. No. 10,461,617, which is a
(Continued)

(51) Int. Cl.
*H02K 16/00* (2006.01)
*H02K 19/10* (2006.01)
(Continued)

(52) U.S. Cl.
CPC .......... *H02K 19/103* (2013.01); *H02K 1/146* (2013.01); *H02K 1/246* (2013.01); *H02K 16/00* (2013.01)

(58) Field of Classification Search
CPC .. H02K 1/246; H02K 16/00; H02K 16/02–04; H02K 19/06; H02K 19/08; H02K 19/103; H02K 19/106
See application file for complete search history.

(56) References Cited

U.S. PATENT DOCUMENTS

| 2010/0066085 A1 | 3/2010 | Gu et al. |
| 2011/0248582 A1 | 10/2011 | Desai et al. |
| 2014/0111038 A1* | 4/2014 | Yang ..................... H02K 15/02 310/46 |

FOREIGN PATENT DOCUMENTS

| JP | H07-163105 A | 6/1995 |
| JP | 2006-025486 A | 1/2006 |

OTHER PUBLICATIONS

Japanese Patent Office, Office action of Nov. 9, 2021 with respect to Japanese Patent Application No. 2020-186007 (Nov. 9, 2021).

* cited by examiner

*Primary Examiner* — Ramon M Barrera
(74) *Attorney, Agent, or Firm* — Temmerman Law; Mathew J. Temmerman

(57) ABSTRACT

A high rotor pole switched reluctance machine (HRSRM) employs an axial and radial mirroring concept and is represented by a first Multiple Rotor Pole (MRP) formula and second Multiple Stator Pole (MSP) formula. A multiple rotor HRSRM comprises at least two rotors each having a plurality of rotor poles and at least two stators having a plurality of stator poles. The at least two rotors and the at least two stators are positioned about a central axis with the stator placed between the rotors. In other embodiments, the number of stators equals the number of rotors and effectively operate as a single stator and rotor. In yet another embodiment, the effective single stator and rotor type high rotor pole switched reluctance machine is realized as single stator and rotor positioned concentrically around a central axis.

31 Claims, 10 Drawing Sheets

Related U.S. Application Data continuation of application No. 15/911,145, filed on Mar. 4, 2018, now Pat. No. 10,658,910, which is a continuation of application No. 15/016,106, filed on Feb. 4, 2016, now Pat. No. 9,960,662.

(60) Provisional application No. 62/173,395, filed on Jun. 10, 2015.

(51) Int. Cl.
*H02K 1/14* (2006.01)
*H02K 1/24* (2006.01)

MIRRORING OF HIGH ROTOR POLE SWITCHED RELUCTANCE MACHINES

RELATED APPLICATIONS

This application is a continuation application of US nonprovisional patent application with Ser. No. 16/010,612 filed Jun. 18, 2018 and granted as U.S. Pat. No. 10,461,617, and which is a continuation application of US nonprovisional patent application with Ser. No. 15/911,145 filed Mar. 4, 2018, and which is a continuation application of US nonprovisional patent application with Ser. No. 15/016,106 filed Feb. 4, 2016 and granted as U.S. Pat. No. 9,960,662, which claims priority from the United States provisional application with Ser. No. 62/173,395 filed Jun. 10, 2015. The disclosures of these applications are incorporated herein as if set out in full.

BACKGROUND OF THE DISCLOSURE

Technical Field of the Disclosure

The present disclosure relates in general to high rotor pole switched reluctance machines. More specifically, the present disclosure relates to mirroring of high rotor pole switched reluctance machines using multiple rotors and stators.

Description of the Related Art

A switched reluctance machine (SRM) is a type of synchronous machine, which can operate as a motor or a generator. Though there are no major differences in construction, an SRM operates as a generator when used to convert mechanical energy into electrical energy or as a motor, when used to convert electrical energy into mechanical energy. Typically, an SRM can be operated in both modes in a cycle. Hence, hereinafter, we shall use the term "machine" instead of motor and/or generator to include both of these operating modes.

SRMs typically include a stator having a plurality of salient stator poles and a rotor having a plurality of salient rotor poles. There are phase windings on the stator, but there are no windings or magnets on the rotor. In most SRMs, each pair of diametrically opposite stator poles is connected in series to form an independent phase of the multiphase switched reluctance machine. In some cases, the stator has coil windings 90° apart connected in series to form one phase. During operation of the SRM, each of the stator poles are successively excited in a predetermined sequence that is synchronized with the angular position of the rotor to generate a magnetic attraction force between the stator poles and corresponding rotor poles to rotate the rotor.

A high rotor pole switched reluctance machine (HRSRM) is an SRM where the number of rotor poles is higher than the number of stator poles for any adjacent set of rotor and stator. Alternately, it can be defined as a machine with multiple rotors and stators where the sum of the number of rotor poles from all individual rotors is higher than the sum of the number of stator poles from all individual stators. An HRSRM has a higher static torque capability and lower torque ripples compared to a conventional SRM. The design requirements of the power converters of these two machines can be different, because an HRSRM has a narrower inductance profile and a higher number of strokes than other configurations with the same number of phases.

One such conventional SRM describes a switched reluctance apparatus having an inner stator having a plurality of poles, a rotor disposed radially outward of the inner stator and having a plurality of segments serving as poles, and an outer stator disposed radially outward of the rotor and having a plurality of poles. A respective winding is disposed between every pair of adjacent poles of either stator. The apparatus operates with a plurality of separately excitable phases, wherein a given phase is excited by energizing the windings corresponding to the given phase. Excitation of a given phase causes induction of magnetic fluxes traversing a region substantially confined to the region of the stators and rotor segments corresponding to the given phase, and causes a substantial amount of flux to enter rotor segments. However, the apparatus does not teach the mirroring of multiple rotors and stators.

Few other SRMs employing double rotors and double stators have been developed. Some SRMs include a double-rotor switched reluctance motor comprising an outer rotor, a middle stator and an inner rotor, wherein the middle stator is arranged between the inner rotor and the outer rotor, and the inner and outer rotors are mechanically fixed together and rotate synchronously so as to form a fixed mechanical output shaft. Some other SRMs include an electrical machine comprising a first stator, a second stator, and a rotor arranged between the first and second stators. The rotor comprises a plurality of rotor poles magnetically isolated from each other in the circumferential direction of the rotor. By arranging a rotor between two stators, the rotor does not necessarily need to carry magnetic flux in a circumferential direction, and consequently a lighter rotor construction may be used. The rotor poles are configured to carry magnetic flux in two opposite directions in order to be able to utilize a reluctance principle and give all the rotor poles an identical construction. However, such SRMs do not teach the mirroring of multiple rotors and stators. Further, none of the above mentioned SRMs come under the category of high rotor pole SRM.

Therefore, there is a need for a high rotor pole switched reluctance machine (HRSRM) that would employ a mirroring concept. The needed HRSRM would be configured to mirror multiple numbers of stators and rotors. Further, the HRSRM would be able to apply the mirroring concept either radially or axially. Such a needed HRSRM would increase the power density and torque density and lower the torque ripples of the machine. Finally, the HRSRM would be designed by a pole definition formula that includes both multiple rotors and multiple stators. The embodiment disclosed herein accomplishes all of these objectives.

SUMMARY OF THE DISCLOSURE

To minimize the limitations found in the prior art, and to minimize other limitations that will be apparent upon the reading of this specification, the preferred embodiment of the present invention provides a high rotor pole switched reluctance machine (HRSRM) using a mirroring concept and discloses two specific formulas which shall be referred to as a Multiple Rotor Pole (MRP) formula and a Multiple Stator Pole (MSP) formula. The mirroring concept can be applied either axially or radially. Further, the HRSRM can be of two topologies—multiple stator and multiple rotor.

A multiple rotor HRSRM comprises at least two rotors positioned about a central axis and each of the rotors comprising a plurality of rotor poles on a lateral rotor surface. At least one stator is positioned about the central axis and placed between, and laterally adjacent to, the rotors. The stator comprises a plurality of stator poles extending from a first lateral stator surface adjacent to one of the rotors to a second lateral stator surface adjacent to the other of the rotors. The plurality of rotor poles is in a numerical relationship with the plurality of stator poles defined by the MRP formula:

$$N_{R,tot} = R \times N_R = (S+1) \times (2N_s - 2)$$

such that R≥2 wherein $N_{R,tot}$ is the total number of rotor poles, R is the number of individual rotors, S is the number of individual stators, $N_R$ is the number of rotor poles per rotor and $N_S$ is the number of stator poles per stator.

A multiple axial stator HRSRM comprises at least two stators positioned about a central axis, wherein each of the stators comprises a plurality of stator poles on a lateral stator surface. At least one rotor is positioned about the central axis and placed between and laterally adjacent to the stators. The rotor comprises a plurality of rotor poles extending from a first lateral rotor surface adjacent to one of the two stators to a second lateral rotor surface adjacent to the other of the two stators. The plurality of stator poles is in a numerical relationship with the plurality of rotor poles defined by the MSP formula:

$$N_{R,tot} = R \times N_R = (S-1) \times (2N_s - 2)$$

such that S≥2 wherein $N_{R,tot}$ is the total number of rotor poles, R is the number of individual rotors, S is the number of individual stators, $N_R$ is the number of rotor poles per rotor and $N_S$ is the number of stator poles per stator.

It is a first objective of the present invention to provide an HRSRM that employs a mirroring concept.

A second objective of the present invention is to provide an HRSRM that is modular or stackable and can include any number of stators and rotors necessary to achieve a desired torque output or any other design consideration.

A third objective of the present invention is to provide an HRSRM that uses an advanced pole definition MSP and MRP formula for design.

Another objective of the present invention is to provide an HRSRM that is able to apply the mirroring concept either radially or axially.

Yet another objective of the present invention is to provide an HRSRM that would employ a multiple rotor or a multiple stator mirroring concept.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention. Thus, the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above, or may address one or more of the problems discussed above. Further, one or more of the problems discussed above may not be fully addressed by any of the features described below.

The present invention provides a family of high rotor pole switched reluctance machines (HRSRM) using a mirroring concept. An HRSRM can be described as any SRM wherein the number of rotor poles is higher than the number of stator poles. There are two ways that the mirroring concept can be applied in the HRSRM. It can either be axial or radial in configuration. At the same time, there can also be two topologies—multiple rotor and multiple stator. The present invention provides a design formula for the two advanced formulations for the design of an HRSRM. The present invention provides a new mathematical formulation for high rotor switched reluctance machines (HRSRM) configured to mirror multiple number of stators and rotors. The present invention provides a design formula for multiple stator and multiple rotor configurations of the HRSRM.

Figure 1:
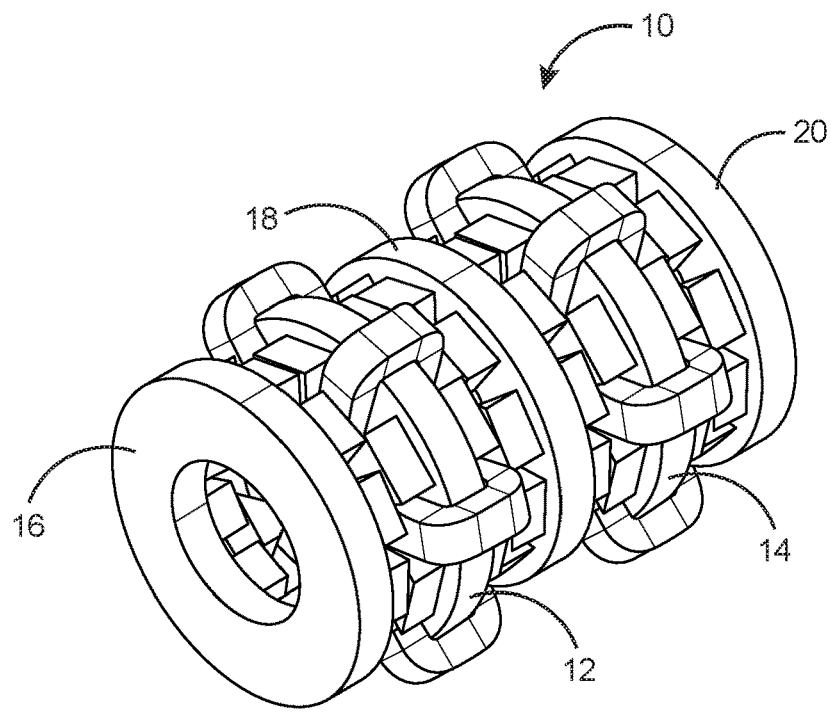
FIG. 1 illustrates a perspective view of an HRSRM with an axial configuration having three rotors and two stators in accordance with the preferred embodiment of the present invention.

Turning now to FIG. 1, a perspective view of an HRSRM 10 with an axial 10/6/10/6/10 configuration having three rotors 16, 18, 20 and two stators 12, 14 in accordance with the preferred embodiment of the present invention is illustrated.

In a multiple rotor configuration, the high rotor pole switched reluctance machine 10 comprises at least two rotors 16, 20 positioned about a central axis (not shown) and at least one stator 12 positioned about the central axis (not shown) and placed between and laterally adjacent to the at least two rotors 16, 20. Each of the at least two rotors 16, 20 comprises a plurality of rotor poles 34 (see FIG. 2B) positioned on a first lateral rotor surface 30. The at least one stator 12 comprises a plurality of stator poles 26 (see FIG. 2A) extending from a first lateral stator surface 22 adjacent to one of the at least two rotors 16 to a second lateral stator surface 24 adjacent to other of the at least two rotors 20 to form a mirroring configuration. The plurality of rotor poles 34 on one of the at least two rotors 16 is positioned opposite the plurality of stator poles 26 on the first lateral stator surface 22 and the plurality of rotor poles 34 on other of the at least two rotors 20 is positioned opposite the plurality of stator poles 26 on the second lateral stator surface 24. The HRSRM 10 of the present invention provides a three phase type machine with the at least two rotors 16, 20 and the at least one stator 12 arranged axially about the central axis to form an axial mirroring configuration.

In the high rotor pole switched reluctance machine 10 of the present embodiment, the at least one stator 12 is positioned between the at least two rotors 16, 20 to provide a multi rotor mirroring configuration. The mirroring configuration changes the saliency associated with the at least one stator 12 and changes the magnetic configuration of the machine 10 which in turn increases the power density and torque density of the machine.

In the multiple rotor configuration, the plurality of rotor poles 34 is in a numerical relationship with the plurality of stator poles 26, the numerical relationship being defined by a Multiple Rotor Pole (MRP) formula:

$$N_{R,tot} = R \times N_R = (S+1) \times (2N_s-2)$$

such that R≥2, wherein $N_{R,tot}$ is the total number of rotor poles, R is the number of individual rotors, S is the number of individual stators, $N_R$ is the number of rotor poles per rotor and $N_S$ is the number of stator poles per stator.

Using the MRP formula for a three-phase machine with 6 stator poles, $N_{R,tot}$ will be equal to 20. These 20 poles would be evenly distributed between the two rotors, i.e. each rotor would have 10 poles each ($N_R$=10) leading to a 10/6/10 configuration. Similarly, using the MRP formula, the following configurations: 14/8/14, 18/10/18, 10/6/10/6/10, 14/8/14/8/14, etc. are possible.

In FIG. 1, a multiple rotor HRSRM 10 with an axial 10/6/10/6/10 configuration having three rotors 16, 18, 20 and two stators 12, 14 in accordance with the preferred embodiment of the present invention is illustrated. A first stator 12 is positioned between a first rotor 16 and a second rotor 18 and a second stator 14 is positioned between the second rotor 18 and a third rotor 20. Each of the stators 12, 14 and rotors 16, 18, 20 rotate about the central axis (not shown) separated by an axial air gap.

Figure 2A:
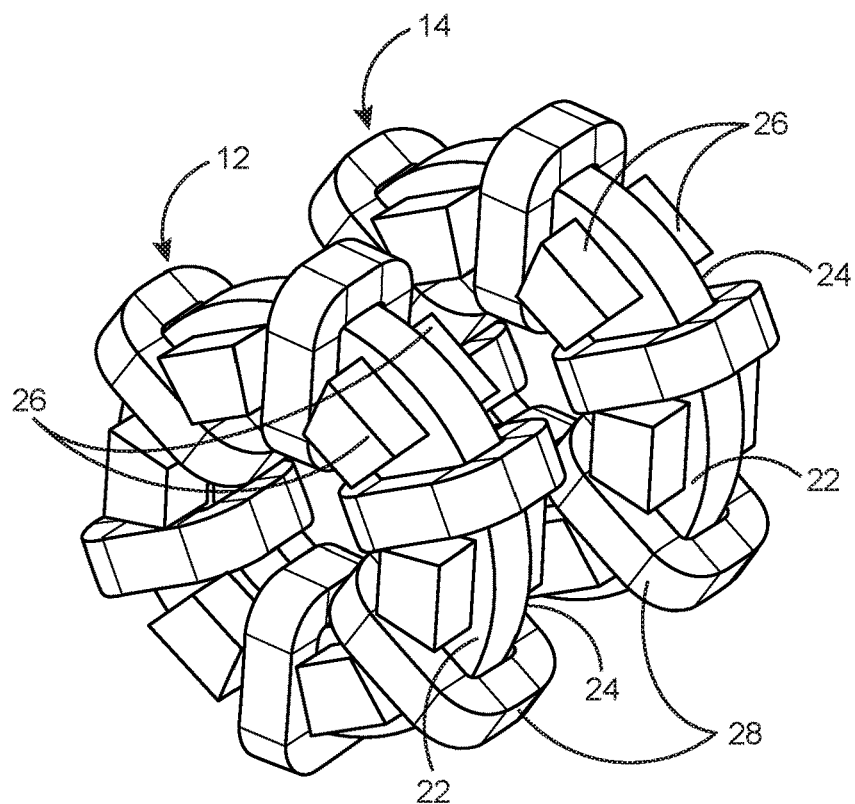
FIG. 2A illustrates a perspective view of the stators of the embodiment of FIG. 1.

FIG. 2A illustrates a perspective view of the stators 12, 14 of the embodiment of FIG. 1. The at least two stators 12, 14 have a disk-like shape with a first lateral stator surface 22 and a second lateral stator surface 24. The first lateral stator surface 22 and the opposing second lateral stator surface 24 are generally parallel to each other and each includes a plurality of stator poles 26 evenly distributed about a circumference of the stators 12, 14. The stator poles 26 project outward, and generally perpendicularly, from the corresponding one of the first stator surface 22 and extends to the second stator surface 24. In this embodiment, each of the at least two stators 12, 14 include six stator poles 26 in three-phase pairs. A plurality of coils 28 are wound around a portion of the at least two stators 12, 14 between any two of the plurality of stator poles 26. In this embodiment, the plurality of coils 28 can preferably be toroidal coils. Here a single winding of coils is used to energize the stator poles 26, extending from the first stator surface 22 to the second stator surface 24. In operation, the six stator poles 26 on the opposing sides of the stators 12, 14 operate in sync with each other.

Figure 2B:
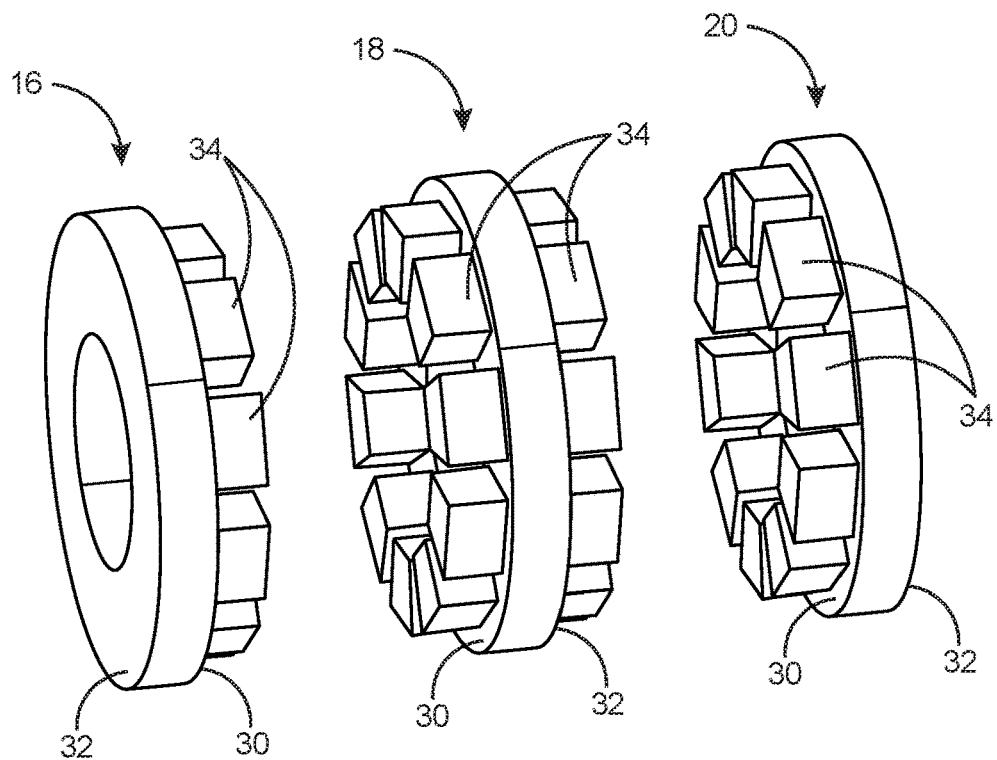
FIG. 2B illustrates a perspective view of the rotors of the embodiment of FIG. 1.

FIG. 2B illustrates a perspective view of the rotors 16, 18, 20 of the embodiment of FIG. 1. The rotors 16, 18, 20 have a disk-like shape with a first lateral rotor surface 30 and a second lateral rotor surface 32. The first rotor surface 30 and the second rotor surface 32 are positioned on opposite sides of the disk-like shape called the backiron and are generally parallel to each other. The rotors 16, 18, 20 include a plurality of rotor poles 34 evenly distributed about a circumference of the rotors 16, 18, 20. In the present embodiment, the plurality of rotor poles 34 project generally perpendicularly from the first rotor surface 30 in the case of the first rotor 16 and the third rotor 20, and from both the first rotor surface 30 and the second rotor surface 32 in the case of the second rotor 18.

Figure 3A:
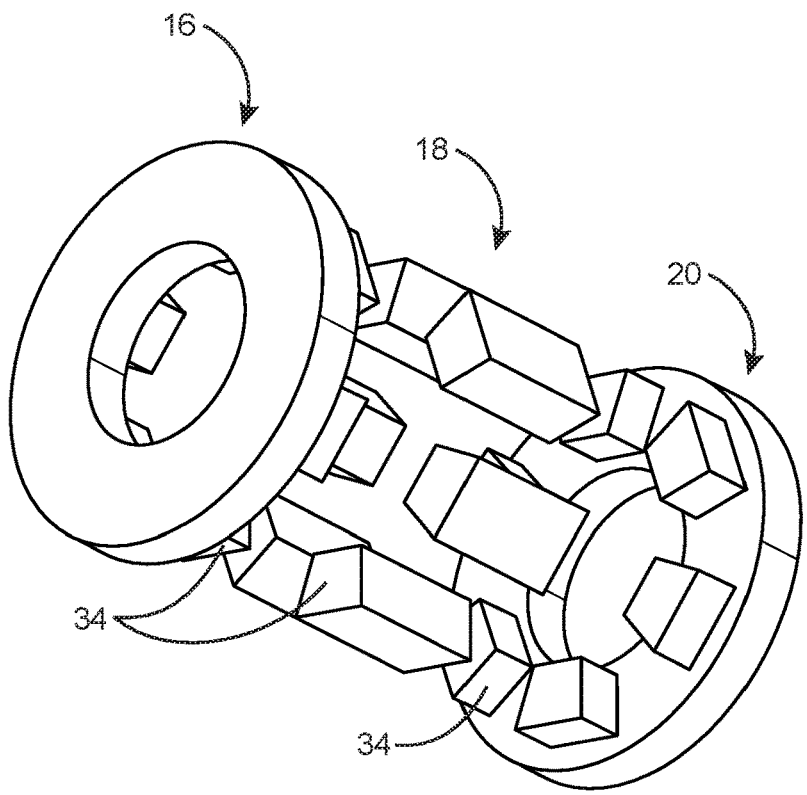
FIG. 3A illustrates a perspective view of the rotors of the embodiment of FIG. 2B without a backiron in one rotor.
Figure 3B:
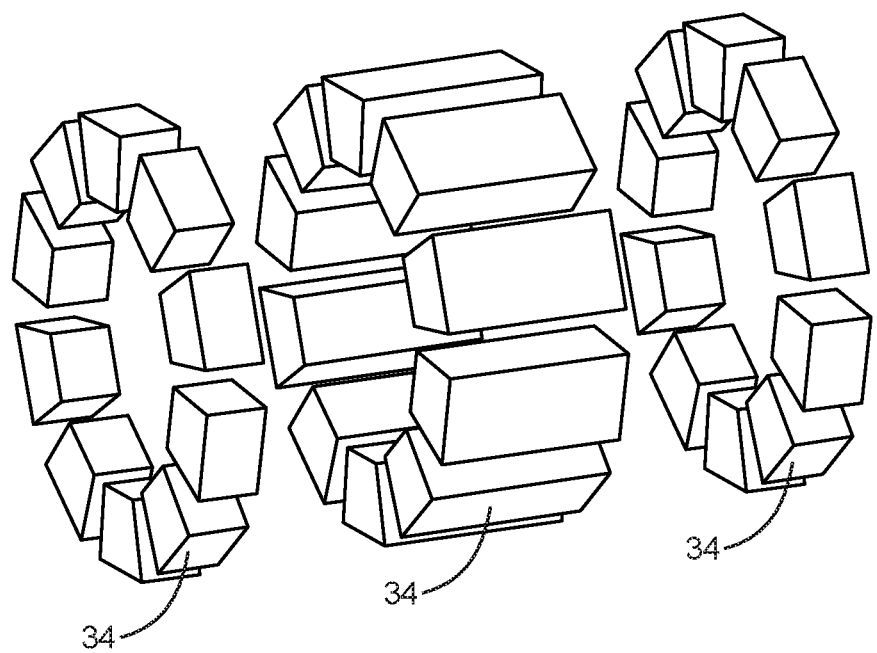
FIG. 3B illustrates a perspective view of a plurality of poles of the rotors of the embodiment of FIG. 2B.

FIGS. 3A-3B illustrate a perspective view of the rotors 16, 18, 20 of the embodiment of FIG. 2B without the backiron. The backiron is removed from the rotor 18 as shown in FIG. 3A and removed from the rotors 16 and 20 as shown in FIG. 3B. FIG. 3B illustrates a perspective view of the plurality of rotor poles 34 of the rotors 16, 18, 20 of the embodiment of FIG. 2B. The plurality of rotor poles 34 can provide a direct path for the magnetic flux to traverse from the stator 12 to the stator 14. This means that the machine is no longer in 6/10/10/6 configuration but is instead a 6/10/6 configuration and is still a mirrored HRSRM.

Figure 4:
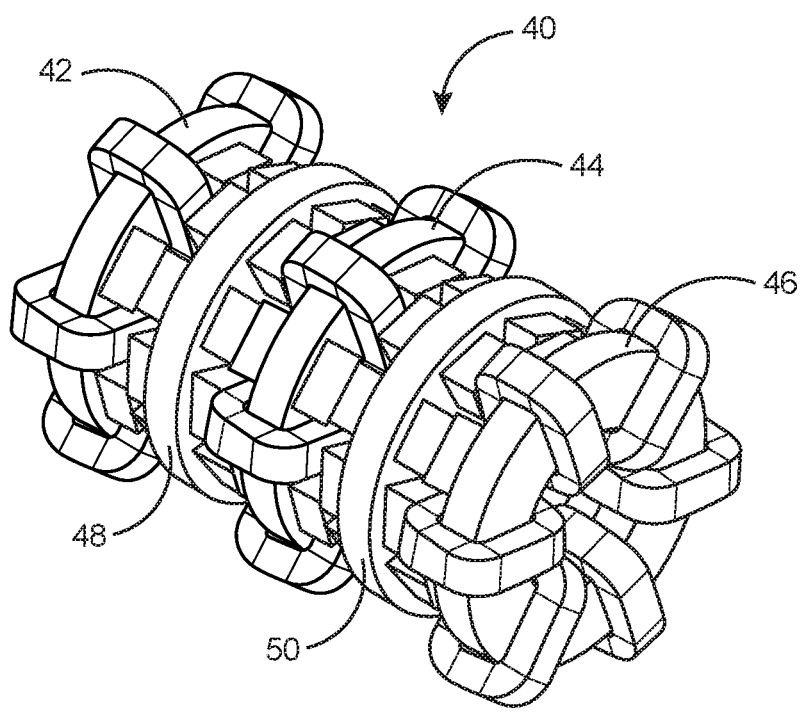
FIG. 4 illustrates a perspective view of the HRSRM with an axial configuration having three stators and two rotors in accordance with the preferred embodiment of the present invention.

FIG. 4 illustrates a perspective view of a multiple stator HRSRM 40 with an axial configuration having three stators 42, 44, 46 and two rotors 48, 50 in accordance with the preferred embodiment of the present invention. In the multiple stator configuration, the HRSRM 40 comprises at least two stators 42, 44 positioned about a central axis (not shown) and at least one rotor 48 positioned about the central axis (not shown) and placed between and laterally adjacent to the at least two stators 42, 44. Each of the at least two stators 42, 44 comprises a plurality of stator poles 62 on a first lateral stator surface 58 (see FIG. 5C). The at least one rotor 48 comprises a plurality of rotor poles 56 (see FIG. 5A) extending from a first lateral rotor surface 52 adjacent to one of the at least two stators 42 to a second lateral rotor surface 54 adjacent to the other of the at least two stators 44. The plurality of stator poles 62 on the at least two stators 42, 44 is positioned opposite the plurality of rotor poles 56 extending from the first lateral rotor surface 52 to the second lateral rotor surface 54. The at least two stators 42, 44 and the at least one rotor 48 are positioned axially about the central axis to form an axial mirroring configuration.

In the multiple stator configuration, the plurality of stator poles 62 is in a numerical relationship with the plurality of rotor poles 56, wherein the numerical relationship is defined by the Multiple Stator Pole (MSP) formula:

$$N_{R,tot} = R \times N_R = (S-1) \times (2N_s-2)$$

such that S>2, wherein $N_{R,tot}$ is the total number of rotor poles, R is the number of individual rotors, S is the number of individual stators, $N_R$ is the number of rotor poles per rotor and $N_S$ is the number of stator poles per stator.

Using the MSP formula for a three-phase machine with 6 stator poles, $N_{R,tot}$ will be equal to 10. The rotor will have 10 poles ($N_{R,tot}=N_R=10$). This would lead to a 6/10/6 configuration. Similarly, using the MSP formula, the following configurations: 8/14/8, 10/18/10, 6/10/6/10/6, 8/14/8/14/8, etc. are possible.

When the mirroring concept is applied to the HRSRM, the saliency associated with the rotor in the case of a multiple stator configuration changes the magnetic configuration of the machine, thereby mathematically reducing a 6/10/10/6 machine to a 6/10/6 machine. The mirroring concept changes the magnetic configuration of machines with multiple stator configurations and multiple rotor configurations.

The multiple stator HRSRM 40 with an axial 6/10/6/10/6 configuration consists of three stators 42, 44, 46 and two rotors 48, 50 in accordance with one embodiment of the present invention as illustrated in FIG. 4. A first rotor 48 is positioned between a first stator 42 and a second stator 44 and a second rotor 50 is positioned between the second stator 44 and a third stator 46. Each of the stators 42, 44, 46 and rotors 48, 50 rotate about a central axis separated by an axial air gap.

Figure 5A:
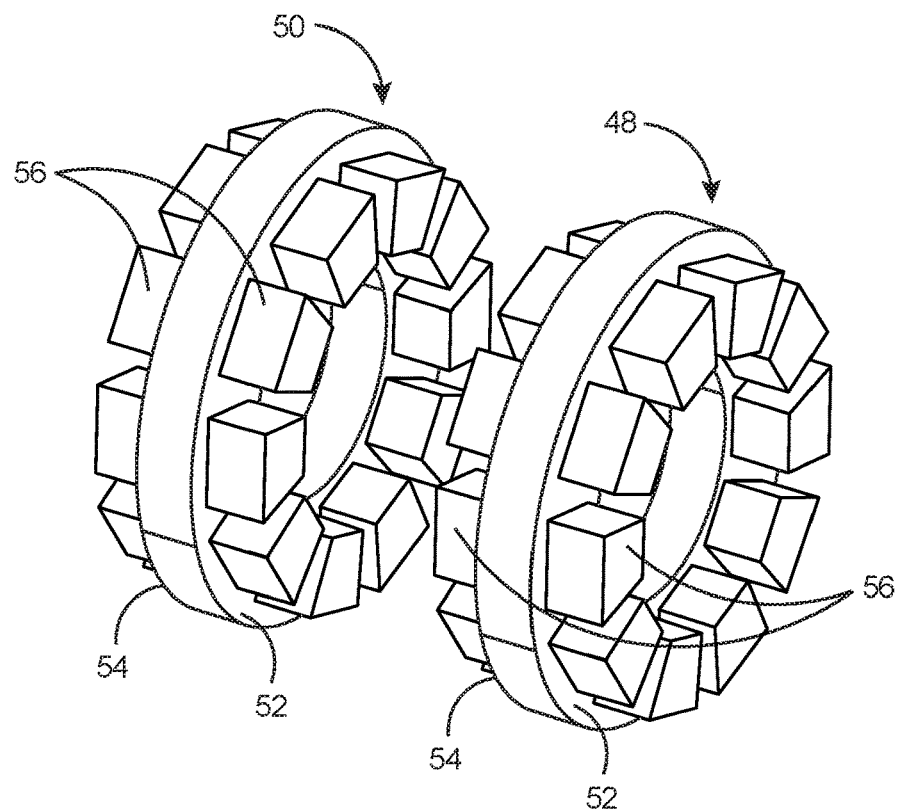
FIG. 5A illustrates a perspective view of the rotors of the embodiment of FIG. 4.
Figure 5B:
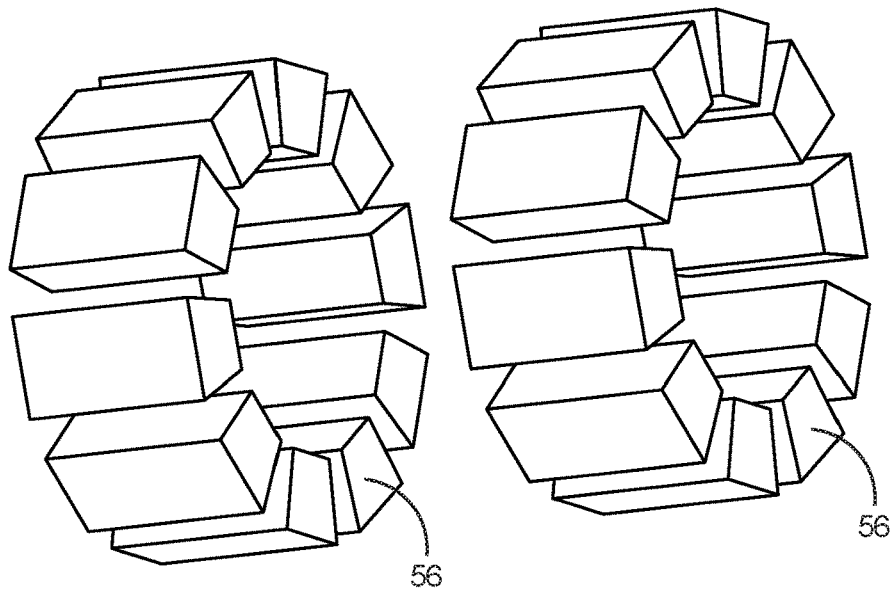
FIG. 5B illustrates a perspective view of the plurality of poles of the rotors of the embodiment of FIG. 5A.

FIG. 5A illustrates a perspective view of the rotors 48, 50 of the embodiment of FIG. 4. The rotors 48, 50 have a disk-like shape with the first lateral rotor surface 52 opposite the second lateral rotor surface 54 which are generally parallel to each other and each include the plurality of rotor poles 56 evenly distributed about the circumference of the rotors 48, 50. The plurality of rotor poles 56 projects generally perpendicularly from the first lateral rotor surface 52 to the second lateral rotor surface 54. The magnetic flux flows from the first stator 42 to the second stator 44 through the plurality of rotor poles 56 extending from the first lateral rotor surface 52 to the opposing second lateral rotor surface 54. FIG. 5B illustrates a perspective view of the plurality of rotor poles 56 of the rotors 48, 50 of the embodiment of FIG. 5A. In this configuration, and for ease of understanding, the backiron is removed to show the plurality of poles 56 of the rotors 48, 50 clearly.

Figure 5C:
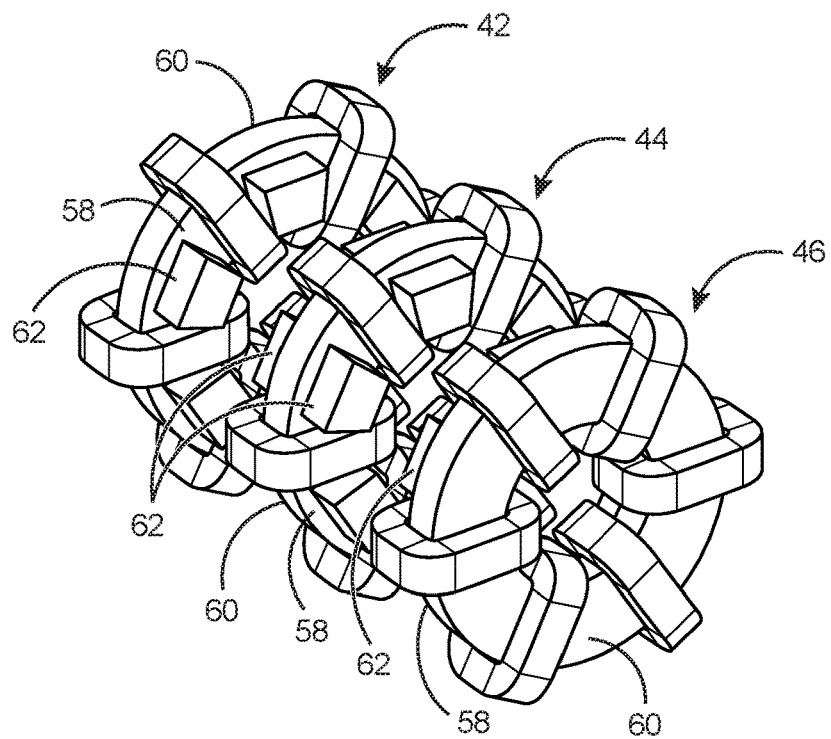
FIG. 5C illustrates a perspective view of the stators of the embodiment of FIG. 4.

FIG. 5C illustrates a perspective view of the stators 42, 44, 46 of the embodiment of FIG. 4. The stators 42, 44, 46 have a disk-like shape having the first lateral stator surface 58 opposing a second lateral stator surface 60 which are generally parallel to each other. In this embodiment, the stators 42, 44, 46 and the plurality of stator poles 62 are evenly distributed about the circumference of the stators 42, 44, 46 and project generally perpendicularly from the first lateral stator surface 58 in the case of the first stator 42 and the third stator 46, and extends from the first stator surface 58 to the second stator surface 60 in the case of the second stator 44. In this embodiment, the stator surfaces 58, 60 include six stator poles 122 in three-phase pairs. A plurality of coils 124 are wound around a portion of the stators 42, 44, 46 and adjacent to one of the corresponding stator poles 62.

Figure 6A:
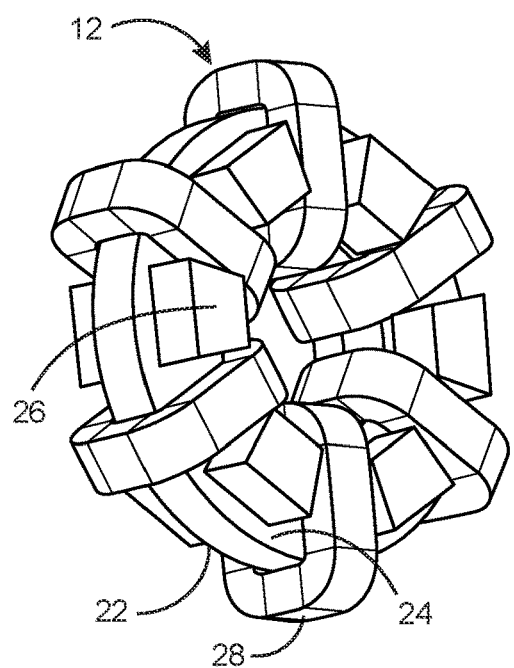
FIG. 6A illustrates a perspective view of a stator of the HRSRM in accordance with one embodiment of the present invention.

FIG. 6A illustrates a perspective view of one embodiment of the stator 12 with toroidal winding configurations for the plurality of coils 28. Each of the plurality of coils 28 are wound as toroidal coils around a portion of the stator 12 and adjacent to each of the plurality of stator poles 26.

Figure 6B:
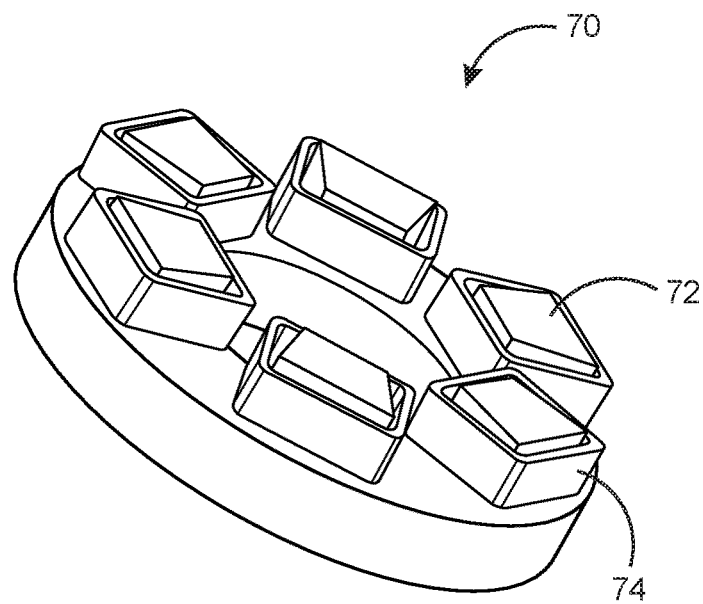
FIG. 6B illustrates a perspective view of the stator of the HRSRM in accordance with another embodiment of the present invention.

FIG. 6B illustrates a perspective view of one embodiment of a stator 70 with concentrated winding configurations for a plurality of coils 74. Each of the plurality of coils 74 is wound as concentrated coils around each of a plurality of stator poles 72.

Figure 7:
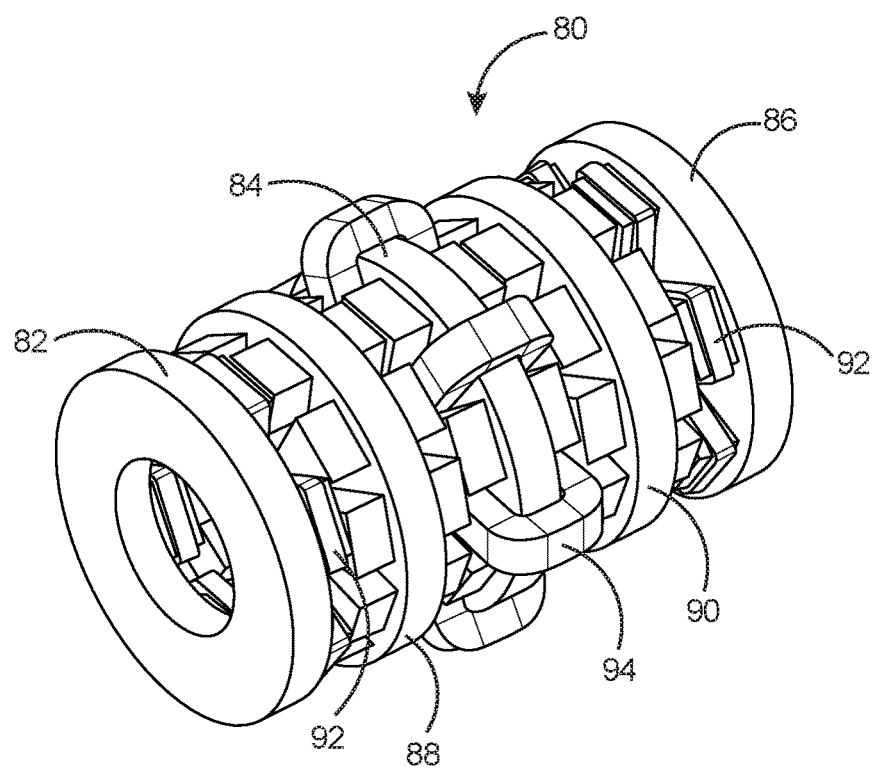
FIG. 7 illustrates a perspective view of the HRSRM with an axial configuration utilizing the stator embodiment of FIG. 6A and FIG. 6B.

FIG. 7 illustrates a perspective view of a multiple stator HRSRM 80 having three stators 82, 84, 86 and two rotors 88, 90 with an axial configuration utilizing the stator embodiments of FIG. 6A and FIG. 6B. In this embodiment, a first stator 82 and a third stator 86 have a plurality of coils 92 with concentrated winding configurations and a second stator 84 has a plurality of coils 94 with toroidal winding configurations. Each of the plurality of coils 92, 94 is made of a magnetic wire, preferably copper.

Figure 8A:
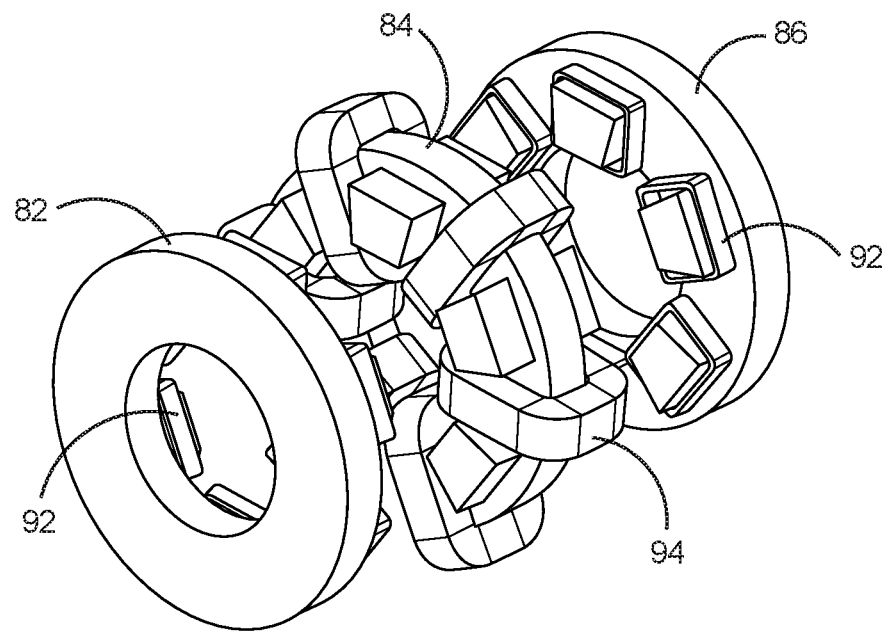
FIG. 8A illustrates a perspective view of the stators of the embodiment of FIG. 7.
Figure 8B:
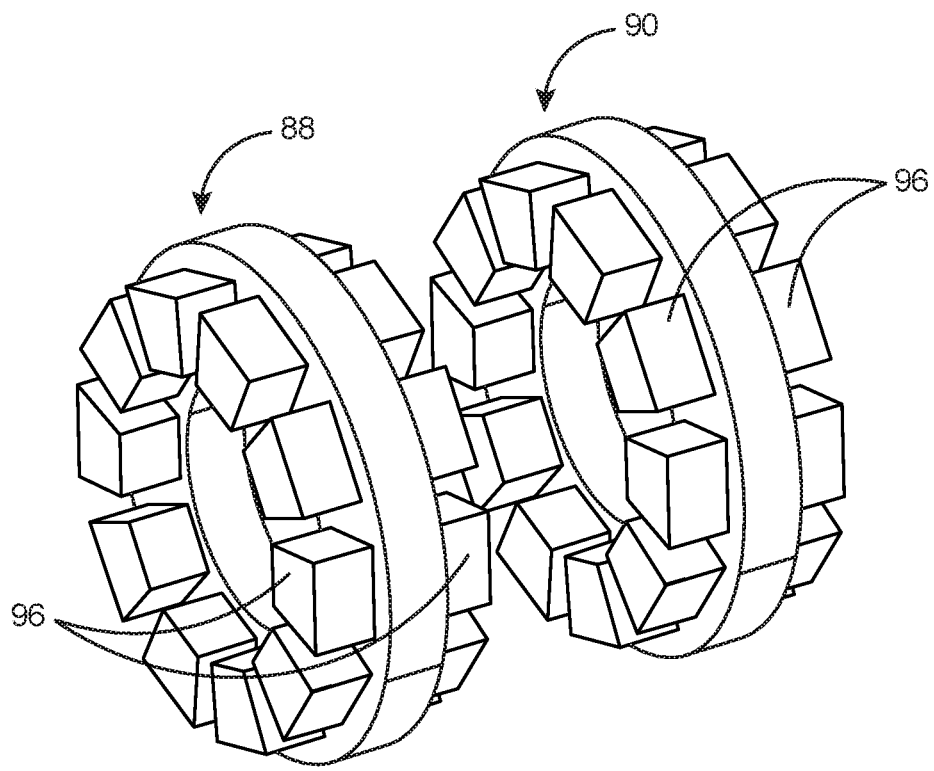
FIG. 8B illustrates a perspective view of the rotors of the embodiment of FIG. 7.

FIG. 8A illustrates a perspective view of the stators 82, 84, 86 of the embodiment of FIG. 7. The first stator 82 and the third stator 86 have the plurality of coils 92 with concentrated winding configurations and the second stator 84 has the plurality of coils 94 with toroidal winding configurations. FIG. 8B illustrates a perspective view of the rotors 88, 90 of the embodiment of FIG. 7 with a plurality of rotor poles 96.

Using the above two formulas, the following configurations of HRSRM are some of those possible: 6/10/6, 10/6/10, 8/14/8, 14/8/14, 10/36/10, 36/10/36, etc. The tables illustrated below shows the general trend of configurations possible for the mirrored HRSRM concept. Table 1 illustrates the configurations possible with the multiple rotor pole (MRP) formula and Table 2 illustrates some of the configurations possible with the multiple stator pole (MSP) formula.

TABLE 1

| S | R | $N_S$ | $N_{S,tot}$ | $N_R$ | $N_{R,tot}$ | Configuration |
|---|---|---|---|---|---|---|
| 1 | 2 | 6 | 6 | 10 | 20 | 10/6/10 |
| 1 | 2 | 8 | 8 | 14 | 28 | 14/8/14 |
| 1 | 2 | 10 | 10 | 18 | 36 | 18/10/18 |
| 2 | 3 | 6 | 12 | 10 | 30 | 10/6/10/6/10 |
| 2 | 3 | 8 | 16 | 14 | 42 | 14/8/14/8/14 |
| 2 | 3 | 10 | 20 | 18 | 54 | 18/10/18/10/18 |

TABLE 2

| S | R | $N_S$ | $N_{S,tot}$ | $N_R$ | $N_{R,tot}$ | Configuration |
|---|---|---|---|---|---|---|
| 2 | 1 | 6 | 12 | 10 | 10 | 6/10/6 |
| 2 | 1 | 8 | 16 | 14 | 14 | 8/14/8 |
| 2 | 1 | 10 | 20 | 18 | 18 | 10/18/10 |
| 3 | 2 | 6 | 18 | 10 | 20 | 6/10/6/10 |
| 3 | 2 | 8 | 24 | 14 | 28 | 8/14/8/14/8 |
| 3 | 2 | 10 | 30 | 18 | 36 | 10/18/10/18/10 |

Figure 9:
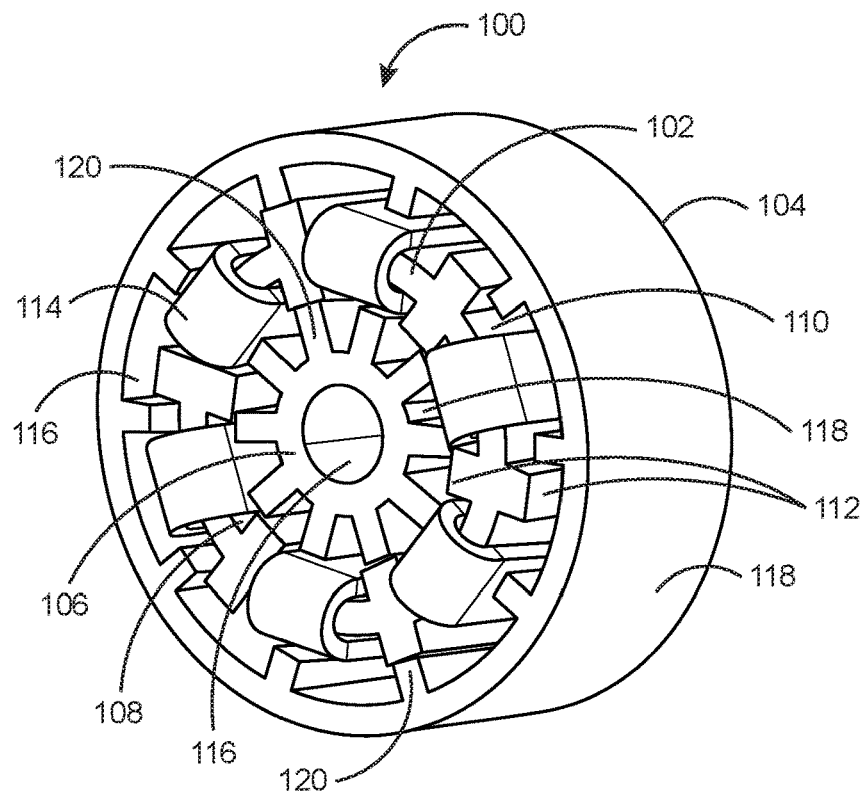
FIG. 9 illustrates a perspective view of a multiple rotor HRSRM with a radial 10/6/10 configuration consisting of one stator and two rotors in accordance with an alternate embodiment of the present invention.

FIG. 9 illustrates a perspective view of a multiple rotor HRSRM 100 with a radial 10/6/10 configuration having one stator 102 and two rotors 104, 106 in accordance with an alternate embodiment of the present invention. A stator 102 is positioned between a first rotor 104 and a second rotor 106 which rotates about a central axis concentric to each other separated by a radial air gap. The stator 102 has a cylindrical shape with a first inner stator surface 108 and a second outer stator surface 110. The first inner stator surface 108 and the second outer stator surface 110 each include a plurality of stator poles 112 evenly distributed about a circumference of the stator 102. The stator poles 112 project perpendicularly inwardly from the first stator surface 108 and outwardly from the second stator surface 110. In this embodiment, the stator surface 102 includes six stator poles 112 in three-phase pairs. A plurality of coils 114 are wound around a portion of the stator 102 and adjacent to one of the stator poles 112. Here, a single winding of coils is used to energize a pair of stator poles 112.

In this embodiment, the rotors 104, 106 are cylindrical in shape. A first rotor 104 is positioned radially outward to the stator 102 and a second rotor 106 is positioned radially inward to the stator 102. Both the first rotor 104 and the second rotor 106 have an outer rotor surface 118 and inner rotor surface 116. A plurality of rotor poles 120 is evenly distributed about the circumference of the rotors 104, 16 and projects generally perpendicularly inwards from the inner rotor surface 116 of the first rotor 104 and perpendicularly outwards from the outer rotor surface 118 of the second rotor 106. In this embodiment, the magnetic flux flows from the plurality of rotor poles 120 on the first rotor 104 to the plurality of stator poles 112 on the second outer stator surface 110 to the first inner stator surface 108 and then to the plurality of rotor poles 120 on the second rotor 106.

Figure 10:
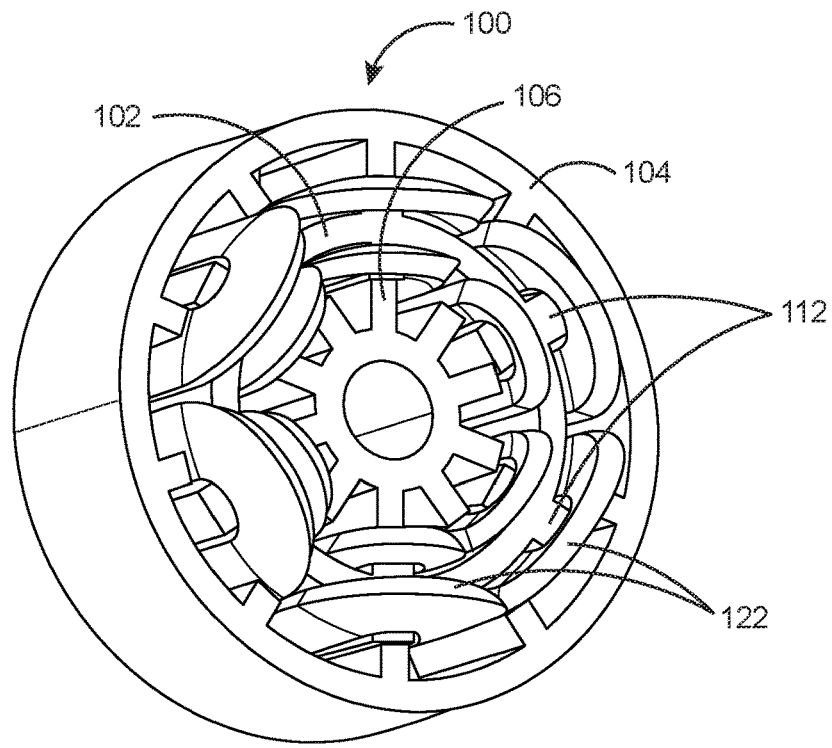
FIG. 10 illustrates a perspective view of the embodiment of FIG. 1 with an alternative coil position.

FIG. 10 illustrates a perspective view of the embodiment of FIG. 1 with an alternative coil position. The plurality of stator poles 112 are arranged on the first inner stator surface 108 and the second outer stator surface 110 (see FIG. 9). In this embodiment, a plurality of coils 122, is collectively wound around each of the plurality of stator poles 112 on the first inner stator surface 108 and the second outer stator surface 110. Each of the coils 122 is made of a magnetic wire, preferably copper, wrapped around a respective stator pole 112 on the first inner stator surface 108 (see FIG. 9) to the second outer stator surface 110 (see FIG. 9). In this configuration, the plurality of coils 122 on the first inner stator surface 108 and the second outer stator surface 110 at any angular position are connected in series to form a single coil.

Figure 11:
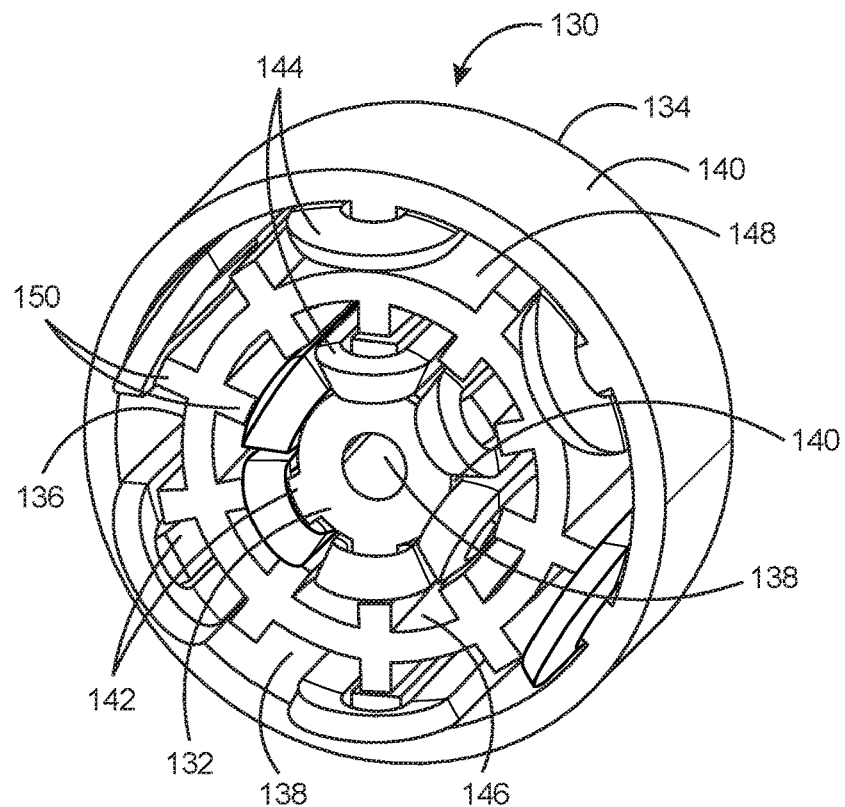
FIG. 11 illustrates a perspective view of an HRSRM with a radial configuration comprising two stators and one rotor in accordance with another embodiment of the present invention.

FIG. 11 illustrates a perspective view of a multiple stator HRSRM 130 with a radial 6/10/6 configuration having two stators 132, 134 and one rotor 136 in accordance with another embodiment of the present invention. A rotor 136 is positioned between a first stator 132 and a second stator 134 which rotate about a central axis concentric to each other separated by a radial air gap. Both the first stator 132 and the second stator 134 have an inner stator surface 138 and an outer stator surface 140. A plurality of stator poles 142 is evenly distributed along the circumference of each of the stators 132, 134 and project generally perpendicularly from the inner stator surface 138 in the case of the second rotor 134 and from the outer stator surface 140 in the case of the first rotor 132.

In this embodiment, each of the stators 132, 134 include six stator poles 142 in three-phase pairs. Each stator pole 142 has a coil, collectively 144, wound around it. Each of the coils 144 is made of a magnetic wire, preferably copper, wrapped around the respective stator pole 142. In this embodiment, the rotor 136 is cylindrical in shape with an inner rotor surface 146 and an outer rotor surface 148. A plurality of rotor poles 60 extends from the inner rotor surface 146 to the outer rotor surface 148 and is evenly distributed about the circumference of the rotor 136. The plurality of rotor poles 150 projects perpendicularly from the inner rotor surface 146 to the outer rotor surface 148.

HRSRMs of other sizes and having other than three phases or six stator poles may be designed in accordance with the multiple rotor pole (MRP) formula and multiple stator pole (MSP) formula as illustrated in Table 1 and Table 2, and the extrapolations easily drawn from the patterns therein.

Figure 12:
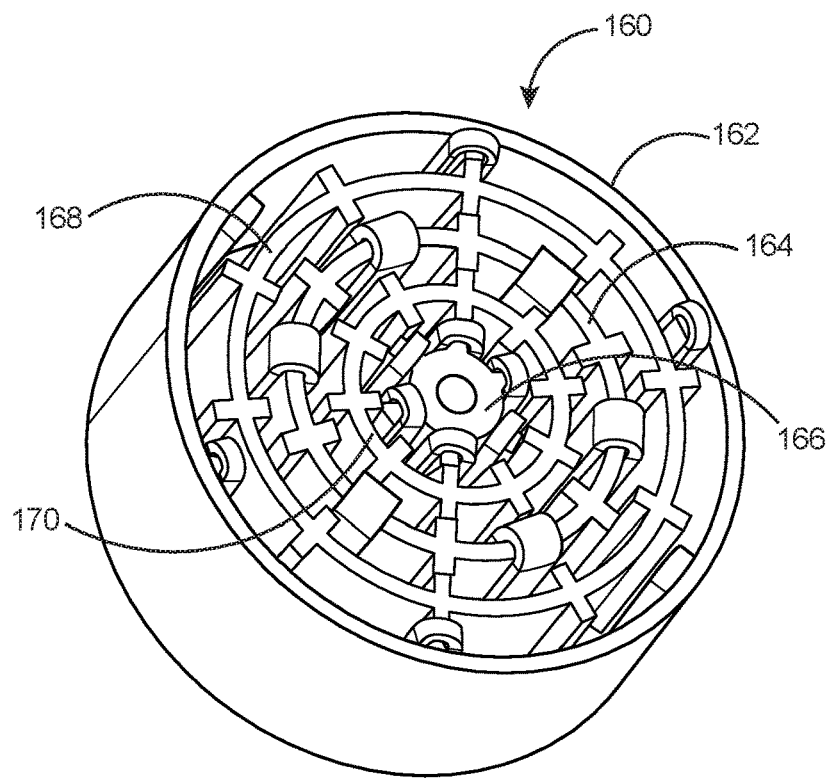
FIG. 12 illustrates a perspective view of an HRSRM with a radial configuration comprising three stators and two rotors in accordance with another embodiment of the present invention.

For example, FIG. 12 illustrates a perspective view of a multiple stator HRSRM 160 with a radial 6/10/6/10/6 configuration having three stators 162, 164, 166 and two rotors 168, 170. The HRSRM 160 has a total of 18 stator poles and 20 rotor poles.

Figure 13:
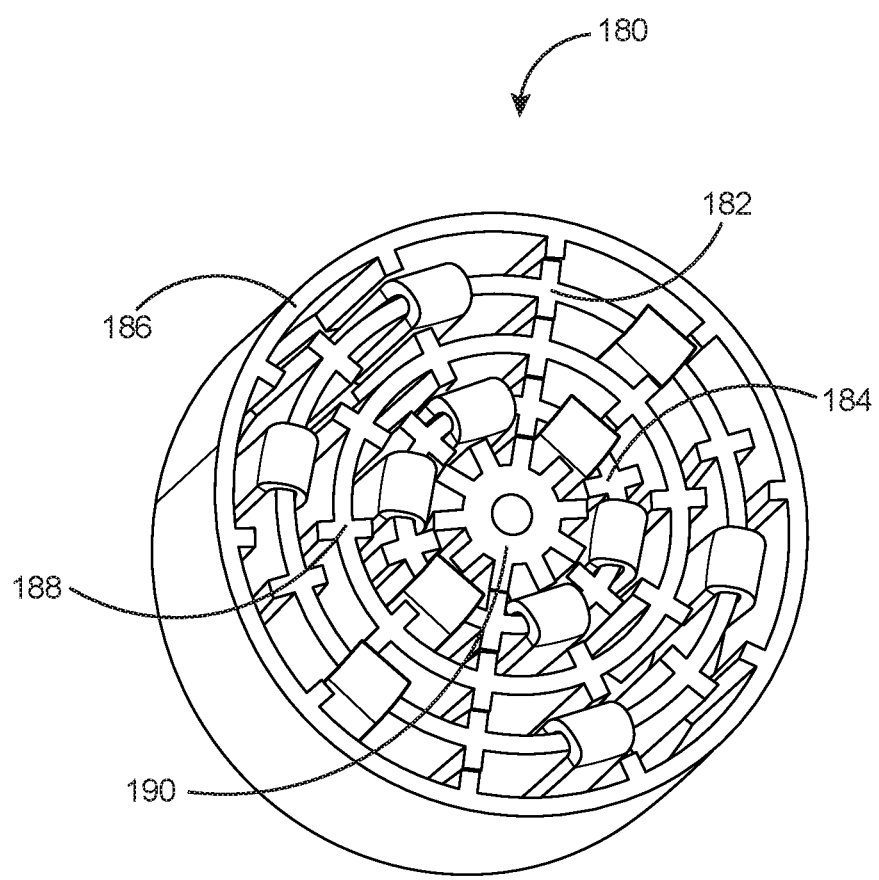
FIG. 13 illustrates a perspective view of an HRSRM with a radial configuration having two stators and three rotors in accordance with another embodiment of the present invention.

FIG. 13 illustrates a perspective view of a multiple rotor HRSRM 180 with a radial 10/6/10/6/10 configuration having two stators 182, 184 and three rotors 186, 188, 190. The HRSRM 180 has 30 rotor poles and 12 stator poles.

The presently disclosed HRSRM design is advantageous because it is modular or stackable and can include any number of stators and rotors necessary to achieve a desired torque output or any other design consideration.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

We claim:

1. A high rotor pole switched reluctance machine comprising:
    at least two rotors positioned about a central axis, each of the at least two rotors comprising a first radial rotor surface on a first side of a rotor backiron, a second radial rotor surface on a second side of the rotor backiron, and a plurality of rotor poles, the rotor poles located on at least one of the radial rotor surfaces and the two sides of the rotor backiron generally parallel to each other; and
    at least two stators positioned about the central axis, at least one of which is placed between the at least two rotors, each of the at least two stators comprising a first and second radial stator surface and a plurality of stator poles, the stator poles located on at least one of the radial stator surfaces;
    wherein said at least two stators are aligned such that all said stator poles exhibit radial symmetry and wherein said at least two rotors are aligned such that all said rotor poles exhibit radial symmetry; and
    wherein a plurality of coils are wound toroidally around a stator backiron.

2. The high rotor pole switched reluctance machine of claim 1 wherein the plurality of rotor poles on one of the at least two rotors is projected opposite the plurality of stator poles on the first radial stator surface of one of the at least two stators.

3. The high rotor pole switched reluctance machine of claim 1 wherein the plurality of rotor poles on the first radial rotor surface of one of the at least two rotors is projected opposite the plurality of stator poles on the second radial stator surface of one of the at least two stators.

4. The high rotor pole switched reluctance machine of claim 1 wherein the plurality of rotor poles on the second radial rotor surface of the at least two rotors is projected opposite the plurality of stator poles on the first radial stator surface of the at least two stators.

5. The high rotor pole switched reluctance machine of claim 1 wherein the plurality of stator poles on the first radial stator surface of the at least two stators is projected opposite the plurality of rotor poles on the second radial surface of the at least two rotors.

6. The high rotor pole switched reluctance machine of claim 1 wherein the plurality of stator poles on the second radial stator surface of one of the at least two stators is projected opposite the plurality of rotor poles on the first radial rotor surface of one of the at least two rotors.

7. The high rotor pole switched reluctance machine of claim 1 wherein the machine is a three-phase type.

8. The high rotor pole switched reluctance machine of claim 1 wherein the machine has a configuration of 10 rotor poles/6 stator poles/10 stator poles.

9. The high rotor pole switched reluctance machine of claim 1 wherein the machine has a configuration selected from the group consisting of 10/6/6/8, 8/6/6/10, 8/6/12/20, 20/12/6/8, 10/6/12/20, 20/12/6/10, 8/6/12/22, 22/12/6/10, 10/6/12/22, 22/12/6/8, 8/12/6/10, 10/6/12/8, 8/6/12/20, 10/6/12/20, 8/6/12/22, or 10/6/12/22.

10. The high rotor pole switched reluctance machine of claim 1 where at least two of said plurality of coils are toroidally wound around the stator backiron and at least two of said plurality of coils are wound around stator poles, circumferentially with respect to the central axis.

11. The high rotor pole switched reluctance machine of claim 1 wherein the number of stator poles and rotor poles is unequal.

12. A high rotor pole switched reluctance machine comprising:
at least two rotors positioned about a central axis, each of the at least two rotors comprising a first radial rotor surface on a first side of a rotor backiron, a second radial rotor surface on a second side of the rotor backiron, and a plurality of rotor poles, the rotor poles located on at least one of the radial rotor surfaces and the two sides of the rotor backiron generally parallel to each other; and
at least two stators positioned about the central axis, at least one of which is placed between the at least two rotors, each of the at least two stators comprising a first and second radial stator surface and a plurality of stator poles, the stator poles located on at least one of the radial stator surfaces;
wherein said at least two stators are aligned such that all said stator poles exhibit radial symmetry and wherein said at least two rotors are aligned such that all said rotor poles exhibit radial symmetry; and
wherein the machine exhibits a configuration of a 10/6/20/6/10, having an outer casing with 10 rotor poles, an inwardly adjacent stator with six windings, an inwardly adjacent rotor with 20 rotor poles, an inwardly adjacent stator with six windings, and a center rotor with ten rotor poles.

13. The high rotor pole switched reluctance machine of claim 12 wherein the plurality of rotor poles on one of the at least two rotors is projected opposite the plurality of stator poles on the first radial stator surface of one of the at least two stators.

14. The high rotor pole switched reluctance machine of claim 12 wherein the plurality of rotor poles on the first radial rotor surface of one of the at least two rotors is projected opposite the plurality of stator poles on the second radial stator surface of one of the at least two stators.

15. The high rotor pole switched reluctance machine of claim 12 wherein the plurality of rotor poles on the second radial rotor surface of the at least two rotors is projected opposite the plurality of stator poles on the first radial stator surface of the at least two stators.

16. The high rotor pole switched reluctance machine of claim 12 wherein the plurality of stator poles on the first radial stator surface of the at least two stators is projected opposite the plurality of rotor poles on the second radial surface of the at least two rotors.

17. The high rotor pole switched reluctance machine of claim 12 wherein the plurality of stator poles on the second radial stator surface of one of the at least two stators is projected opposite the plurality of rotor poles on the first radial rotor surface of one of the at least two rotors.

18. The high rotor pole switched reluctance machine of claim 12 wherein the machine is a three-phase type.

19. The high rotor pole switched reluctance machine of claim 12 wherein the machine has a configuration of 10 rotor poles/6 stator poles/10 stator poles.

20. The high rotor pole switched reluctance machine of claim 12 wherein the total number of rotor teeth exceeds the total number of stator teeth.

21. The high rotor pole switched reluctance machine of claim 12 wherein the machine has a configuration of 10 rotor poles/6 stator poles/10 stator poles.

22. The high rotor pole switched reluctance machine of claim 12 wherein the machine has a configuration selected from the group consisting of 10/6/6/8, 8/6/6/10, 8/6/12/20, 20/12/6/8, 10/6/12/20, 20/12/6/10, 8/6/12/22, 22/12/6/10, 10/6/12/22, 22/12/6/8, 8/12/6/10, 10/6/12/8, 8/6/12/20, 10/6/12/20, 8/6/12/22, or 10/6/12/22.

23. The high rotor pole switched reluctance machine of claim 12 wherein the machine has a configuration of 10/6/12/20.

24. A high rotor pole switched reluctance machine comprising:
at least two rotors positioned about a central axis, each of the at least two rotors comprising a first radial rotor surface on a first side of a rotor backiron, a second radial rotor surface on a second side of the rotor backiron, and a plurality of rotor poles, the rotor poles located on at least one of the radial rotor surfaces and the two sides of the rotor backiron generally parallel to each other; and
at least two stators positioned about the central axis, at least one of which is placed between the at least two rotors, each of the at least two stators comprising a first and second radial stator surface and a plurality of stator poles, the stator poles located on at least one of the radial stator surfaces;
wherein said at least two stators are aligned such that all said stator poles exhibit radial symmetry and wherein said at least two rotors are aligned such that all said rotor poles exhibit radial symmetry;
wherein any combination of adjacent rotor and stator teeth satisfies the Multiple Rotor Pole (MRP) formula $N_{R,tot} = R \times N_R = S+1 \times (2N_S-2)$, wherein $N_{R,tot}$ is the total number of rotor poles, R is the number of individual rotors, S is the number of individual stators, $N_R$ is the number of rotor poles per rotor and $N_S$ is the number of stator poles per stator; and
wherein the total number of rotor teeth exceeds the total number of stator teeth.

25. The high rotor pole switched reluctance machine of claim 24 wherein the machine has a configuration of 10 rotor poles/6 stator poles/10 stator poles.

26. The high rotor pole switched reluctance machine of claim 24 wherein the machine has a configuration selected from the group consisting of 10/6/6/8, 8/6/6/10, 8/6/12/20, 20/12/6/8, 10/6/12/20, 20/12/6/10, 8/6/12/22, 22/12/6/10, 10/6/12/22, 22/12/6/8, 8/12/6/10, 10/6/12/8, 8/6/12/20, 10/6/12/20, 8/6/12/22, or 10/6/12/22.

27. The high rotor pole switched reluctance machine of claim 24 wherein the plurality of rotor poles on one of the at least two rotors is projected opposite the plurality of stator poles on the first radial stator surface of one of the at least two stators.

28. The high rotor pole switched reluctance machine of claim 24 wherein the plurality of rotor poles on the first radial rotor surface of one of the at least two rotors is projected opposite the plurality of stator poles on the second radial stator surface of one of the at least two stators.

29. The high rotor pole switched reluctance machine of claim 24 wherein the plurality of rotor poles on the second radial rotor surface of the at least two rotors is projected opposite the plurality of stator poles on the first radial stator surface of the at least two stators.

30. The high rotor pole switched reluctance machine of claim 24 wherein the plurality of stator poles on the first radial stator surface of the at least two stators is projected opposite the plurality of rotor poles on the second radial surface of the at least two rotors.

31. The high rotor pole switched reluctance machine of claim 24 wherein the plurality of stator poles on the second radial stator surface of one of the at least two stators is projected opposite the plurality of rotor poles on the first radial rotor surface of one of the at least two rotors.

* * * * *